Oct. 27, 1964   J. S. BENTLEY   3,153,944
ENGINE CONTROLS
Filed June 20, 1960
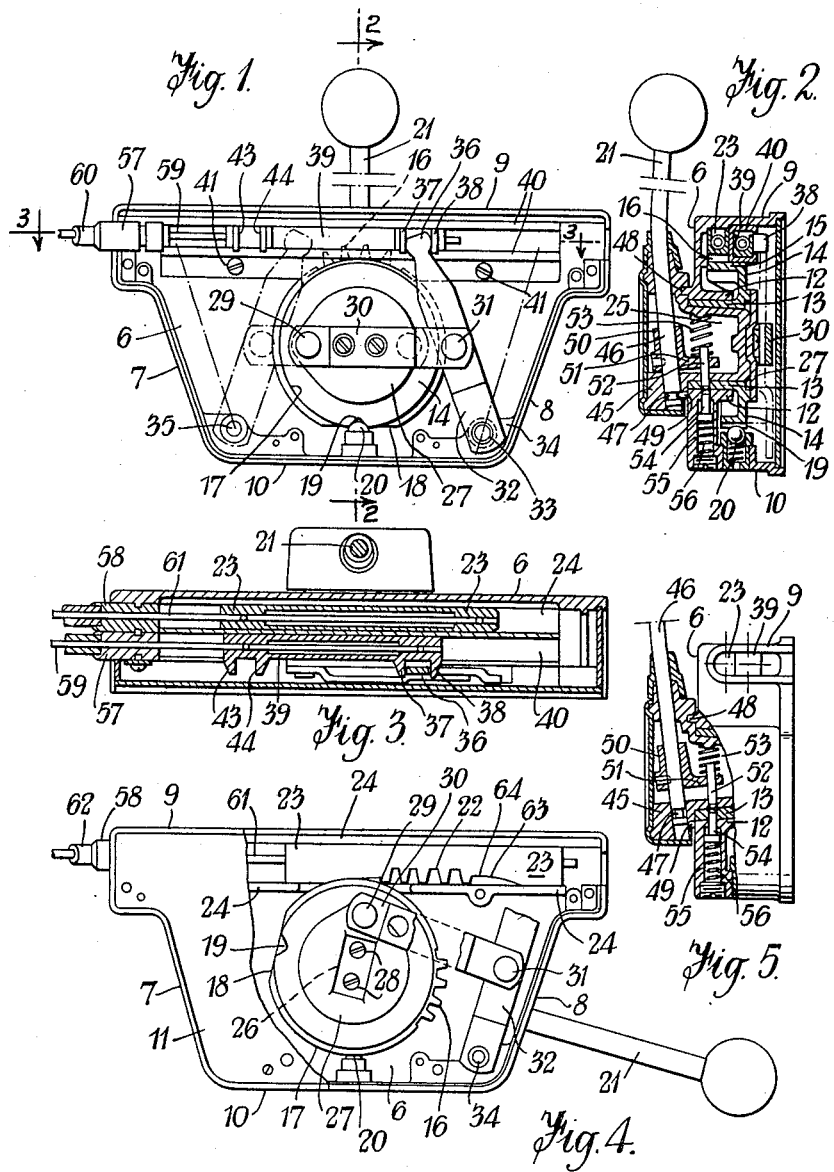
Inventor
James Sidney Bentley
By: Olson & Trexler
attys United States Patent Office 3,153,944
Patented Oct. 27, 1964

3,153,944
ENGINE CONTROLS
James Sydney Bentley, London, England, assignor to Teleflex Incorporated, Wilmington, Del., a company of Delaware
Filed June 20, 1960, Ser. No. 37,432
Claims priority, application Great Britain Sept. 11, 1959
9 Claims. (Cl. 74—472)

This invention relates to engine and other controls of the type in which a single operating lever effects two distinct purposes, for example, in the case of an engine, one to engage gears for either the forward or reverse running, according to the direction of movement of the lever from a neutral position, and the other for the progressive opening of the engine throttle from the idle running position, by the movement of the lever in either direction from a neutral position, and has for its objects to provide such controls of simple and efficient form adapted for a variety of purposes and settings, for example the control of inboard or outboard motors of various types for marine vessels.

A control of the above type, according to the present invention, comprises a casing having mounted in a main bearing thereof the hub of a toothed wheel, only a small angular part of the periphery of which is toothed, while the non-toothed remainder of the periphery is reduced in diameter. This hub has mounted to turn therein another hollow hub, the inner end of which has mounted to turn therewith a projecting crankpin, while the other end projects from the casing and is formed as a boss having diametrically arranged aligned bores for a radially projecting operating lever which may terminate in a knob or other handle.

This lever is mounted for slight longitudinal movement in its own axis so that in one extreme position of this movement it controls means by which the two hubs are coupled together in order that when the lever is turned in either direction, both hubs are rotated about their common axis, while in the other extreme position due to the longitudinal movement, when the lever is turned it only rotates the inner hub while the outer hub is held from rotation.

Two slides are mounted for rectilinear movement in the casing. One has in its central position a short section of toothed rack, terminated at each end by a curved portion, the teeth to mesh with the teeth on the wheel having the outer hub and the end curved portions to hold the slide from further longitudinal movement when the non-toothed portion of the toothed wheel engages therewith and moves thereunder. The other slide has spaced abutments or the like to be engaged by the free end of a one-arm rocking lever linked to the crankpin of the inner hub.

The arrangement is such that when the outer hub, having the integral toothed wheel, is moved by the movement of the operating lever from the neutral position in one direction, the associated rack and slide move in one direction, while when the lever is moved from the neutral position in the other direction the rack and slide move in the reverse direction. The slide only moves a short distance in either direction as, after this, the teeth of the wheel and the teeth of the rack disengage and the peripheral portion of the wheel which is without teeth and of reduced diameter, engages and rides against the correspondingly curved portion which terminates the rack of the slide at both extremities thereof. Continued angular movement of the lever about the axis of the hubs is not prevented, however.

The inner hub moves whenever the outer hub is moved and moves also when the outer hub is held from movement.

The arrangement is such that at the neutral position of the lever the crank pin is at a dead centre of its throw, and the slide with the projecting abutments which is controlled from the crank pin is at one extreme position of its movement. As a consequence, when the operating lever is moved in either direction, at the first relatively small angular movement, say about 22½°, the slide is only moved through a relatively small fraction of its total stroke, while after this the amount of movement of the slide is more in accordance with the amount of movement of the lever, until the crankpin moves towards the other dead centre. Moreover, it should be realized that the lever can be moved from either side of the neutral position through the greater part of two right angles. This enables it to exercise a more or less precisely regulated control.

Each of the slides is connected to a guided multi-stranded cable, control wire, rod or otherwise, which operates by pull or by push or by both pull and push, and which can be connected to the device to be controlled directly or through servo-motor means of any suitable kind, according to the precise circumstances in any particular case.

Further, as the slides have a rectilinear motion, either end of each slide can be connected to such a control cable or the like. This enables controls according to the invention to be installed so that they can be operated from any one of a number of suitably positioned "stations."

In order that the invention may be better understood, it will now be described with reference to the accompanying drawings which are somewhat diagrammatic and are given by way of example only, and in which:

FIG. 1 is a rear elevation of a "single-lever" control, according to one embodiment of the invention, with the back cover plate removed and the operating lever in the neutral position.

FIG. 2 is a sectional side elevation of FIG. 1 through the central axis thereof.

FIG. 3 is a sectional plan of FIG. 1 in the plane of the "axes" of the slides.

FIG. 4 is a somewhat similar view to FIG. 1, but with parts removed and broken away, to show the slide with the central toothed rack portion, which is in one of its extreme positions, and FIG. 5 is a similar view to FIG. 2, but only partly in section and with some of the parts in another position.

In the drawings, the invention is shown as applied to an engine control, and the structure comprises a casing with an open back, somewhat rectangular in form as shown and with a front 6, two sides 7 and 8 which slope downwardly and inwardly in a symmetrical manner, a top 9 and base 10 which extend rearwardly and have a back plate 11 secured thereto by screws.

At the central position of the front 6, the casing has a rearwardly extending integral hollow boss 12, the interior of which forms a bearing for a hub 13 of a wheel 14 the peripheral portion of which is formed by a flange 15 having teeth 16 over about 60° and the remainder of the peripheral portion 17 of a reduced radius extending to half the height of the teeth. In a position diametrically opposite to the teeth, the peripheral portion has a flat 18 at the central position of which the flange of the wheel has an axially extending notch or groove 19 to co-operate with a spring-pressed ball detent 20 mounted in the base 10 to "register" the wheel 14 in the neutral position, which is the position shown in FIGS. 1, 2 and 3 and which also is the neutral position of the operating lever 21 hereafter referred to.

The teeth 16 of the wheel 14 engage the rack of teeth 22 (FIG. 4) formed in a slide 23 mounted for movement in guideways just below the top 9 and to the rear of the front 6 of the casing.

The rack teeth 22 are only situated at the central portion of the slide 23 and this latter has end curved portions 63 for engagement by the circumferential non-toothed peripheral portion 17 (as shown in FIG. 4) when the slide 23 has been moved in one extreme end of its path. As will be seen from FIG. 4, at each end of the rack of teeth is a half-tooth which extends to the adjacent curved portion 63 by a short straight portion 64.

When the parts are in the neutral position of FIG. 1, the teeth 16 of the wheel are located in a symmetrical manner on each side of the neutral line and these are in mesh with the teeth 22 of the slide, which teeth and slide are also disposed symmetrically on each side of the neutral line.

Mounted to turn in the hub 13 of the toothed wheel 14 is another hub 25, the inner end of which is closed and has a diametric recess 26 on its exterior (FIG. 4) which, in the neutral position of the operating level 21, is horizontally disposed. It serves to receive a correspondingly shaped pressed-up portion of a disc 27 which is fastened therein by two spaced screws 28. This disc 27 in one position, at a desired radial distance from the axis of the hub, has a projecting crankpin 29. This crankpin has pivoted thereto one end of a connecting rod 30, the other end of which is pivoted at 31 to a mid position of a one-armed rocking lever 32, the pivot 33 of which is in a bearing 34 at the right-hand side (FIG. 1) of the interior of the casing.

A similar bearing 35 is provided at the other bottom corner, so that the one-armed rocking lever 32 can be mounted at this side if desired, as shown in dot-and-dash lines (FIG. 1). In this last-mentioned case, the screws 28 are removed and the disc 27 set at 180° spacing from that shown in FIG. 1, which brings the crankpin 29 to the right-hand side.

The upper end of the rocking lever 32 is shaped at 36 to be disposed between two abutments 37 and 38 projecting from the rear vertical face of another rectilinear slide 39, to the rear of the first-mentioned slide 23 and working in a guideway 40 detachably secured in position by screws 41 to the rear of the front of the casing, as seen in FIGS. 1 and 2.

In the neutral position (FIG. 1) this second slide 39 is in the one extreme position of its movement, and when the one-armed lever 32 (full-line position FIG. 1) has been rocked through its maximum angle as indicated in FIG. 4, the said slide 39 is brought to its other extreme position.

Each end of this slide has a pair of spaced abutments; thus, in FIG. 1, in addition to the abutments 37 and 38 there are others 43 and 44. As a consequence, when the rocking lever 32 is on one side of the inner hub it engages one pair 37, 38 as shown in FIG. 1, and when on the other side engages the other pair 43, 44. That is to say, the slide 39 will be moved a little to the right from the position shown in FIG. 1, for the abutments 43 and 44 to come in a position to be engaged by the end of the lever 32, for the neutral position.

On the exterior of the casing, the inner hub 25 has an enlarged boss 45 with a diametric bore therethrough slightly inclined to the vertical as seen in FIG. 2, across which passes the lower end of a circular rod 46 which is the stem of the operating lever 21. This rod 46 does not project beyond the boss at its lower end and has an annular groove at this end dimensioned and positioned to engage an annular ridge 48 projecting from the front surface 6 of the casing and concentric with the main bearing 12 therein. At its lowermost position this ridge is discontinued to form a gap 49 to allow the grooved end 47 of the lever rod 46 to be brought out of engagement with the ridge, by pulling upwards on the rod in the direction of its axis; this is the position shown in FIG. 5. If then the inner hub 25 is turned by the lever 21, this lever is held in its outer position as its actual end extremity now rides on the interior surface of the annular ridge 48 on the front of the casing.

The portion of the rod 46 which extends across the hollow interior of the inner hub 25, has mounted thereon and secured thereto a small sleeve 50 which has a radially projecting arm 51 directed into the interior of the inner hub. This arm 51 has a pin 52 fixed thereto which projects downwardly parallel to the rod 46, and the end of this pin, when the operating lever rod 46 is in its lower position, passes as shown in FIG. 2 into aligned apertures in the walls of the inner and outer hubs 25 and 13, to connect them for rotation. There is also a helical compression spring 53 around the upper end of the pin 52 which abuts the arm 51 and the interior surface of the inner hub 25. This spring acts to keep the lever rod 46 in its lower position and the pin 52 connected thereto in engagement with the aligned apertures in the two hubs 25 and 13.

When the lever rod 46 is pulled upwardly, however, this spring 53 is still further compressed, and the end of the pin 52 is pulled out of the aperture in the outer hub but remains in the aperture in the inner hub 13. Rotation of the operating lever 21 (46) in this position only turns the inner hub.

In axial alignment with the aperture in the wall of the outer hub 13 when the toothed wheel is in the neutral position (FIG. 2) is another pin 54 slidably mounted in a passageway 55 of the fixed casing and kept pressed outwardly by a helical compression spring 56 which, however, exerts appreciably less thrust than the first-mentioned helical spring 53. As a consequence, when the pin 52 is withdrawn from the aperture in the outer hub 13, the pin 54 of the casing is forced up by its compression spring 52, to enter this aperture and thus lock the outer hub from rotation; this is the position shown in FIG. 5.

Upon returning to the neutral position, the lever rod 46 can be returned by the spring 53 of its associated pin 52, to its lower position, and by this movement the end of the lever pin 52 forces the upper end of the casing pin 54 downwardly from out of engagement with the outer hub 13.

In alignment with the two slides 23 and 39, either side of the casing at the upper part can have connectors for the guiding conduits of the control cables, wires, rods or the like which can enter the casing from one or both sides, for suitable connection to the slides.

In the drawings, these connectors 57 and 58 are shown on the left-hand side of FIGS. 1, 3 and 4, the flexible control cable 59 fixed to the slide 39 being guided by the flexible conduit 60 attached to the connector 57, while the flexible control cable 61 fixed to the slide 23 is guided by the flexible conduit 62 attached to the connector 58.

The slide 23 operated by the gear wheel 14 is connected to the gear change of the engine so that according to the direction of movement of the operating lever 21 from the neutral position, the forward or reverse gear may be engaged.

Assuming the angular movement for this engagement in either direction to be, say, 45°, it is preferred so to arrange the dog clutches or the like of the gears that they do not commence to come into engagement until, say, 22½° of this movement has been effected. When the full movement has taken place, the clutch (for forward or reverse running, as the case may be) is fully engaged and the teeth 22 of the rack of the slide 23 are no longer in engagement with the teeth 16 of the gear wheel 14, as this slide has been brought to one of its extreme positions.

The slide 39 operated from the crankpin 29 controls the throttle, and after starting the engine in any usual manner the operating lever is first pulled upwards to its upper position so that when it is turned, only the inner hub 25 rotates, whereby the throttle is moved, from the idling position (which corresponds to the neutral position of the lever 21). In this manner, after starting the engine, for example by the usual starting switch, the engine may be revved up by further opening the throttle, with the gears remaining in neutral.

The operating lever 21 is now returned to the neutral position and the engine continues to run in the idling position until the lever 21 is brought to its lowest position, by the spring 53, for the inner hub 25 again to be connected to the outer hub 13. Then by turning the lever 21 in the required direction, the forward or reverse gear of the engine will be engaged, and by continued movement of the lever in the same direction (whichever it may be) the throttle will gradually be more fully opened.

FIG. 4 shows how the lever 21, having caused the slide 23 to be moved to one of its extreme positions, has been further turned, through the best part of a right angle, to move the rocking lever 32 to the position for the full opening of the throttle.

If the throttle opens by "pull" on the control cable, then the crankpin 29 and its associated rocking lever 32 must be set on one side of the inner hub (as seen in rear elevation), and if by "push," on the other side of the inner hub, and the starting position of the slide 39 operated by the rocking lever must also be changed as hereinbefore set forth.

When fitting engine controls according to the invention as particularly described, it will be realized that the symmetrical shaping of the casing, the fact that the control cables 59 and 60 can emerge from either side of the casing, and the further fact that the position of the crankpin 29 and its associated one-armed rocking lever 32 can be changed, allows the control to be disposed in any position to the right or left of the user or forwardly or rearwardly. This is a great advantage when controls are for use in boats such as motor cruisers, especially when they are driven by outboard motors, as it enables one control readily to be set up and adapted to a great variety of seating accommodation and particular types of motors employed.

Further, in some cases the operating lever, such as 21, can project downwardly, in the neutral position, so that in place of a forward push to engage the forward drive gear and a rear pull for a reverse drive, the effect is that it is necessary to "pull" rearwardly for the forward drive and "push" forwardly for the reverse drive.

Controls according to the present invention are not limited to engine controls, but can be used or adapted for use for other controlling purposes; for example, for starting-up and stopping diesel generator sets, for starting-up certain types of electrical generators, for starting-up and stopping other types of engines, and clutching and unclutching such engines to and from their loads.

The invention is not limited to the precise forms or details of construction herein described, as these may be varied to suit particular requirements.

The invention is claimed as follows:

1. A control of the type described comprising a housing, a first member rotatably supported in said housing, a second member concentrically and rotatably supported within said first member, a first motion transmitting device slidably disposed in said housing, means on said first member coacting with said first motion transmitting device to impart straight line movement thereto upon rotation of said first member, a second motion transmitting device slidably disposed in said housing, means on said second member coacting with said second motion transmitting device to impart straight line movement thereto upon rotation of said second member, a single operating lever carried by and rotatably in unison with one of said members and being radially shiftable relative thereto between first and second positions, and a mechanism normally connecting said first and second members for rotation in unison with said lever when said lever is in said first position, said lever coacting with said mechanism for operatively disconnecting said first member from said lever when said lever is in said second position.

2. A control as set forth in claim 1 in which said mechanism comprises alignable apertures in said first and second members, a detent member fixed to said lever and slidably movable within said apertures and spring means normally biasing said lever to said first position in which said detent is disposed in both of said apertures.

3. A control as set forth in claim 2 in which said connecting mechanism also includes a second detent member engageable with said first member when said lever is in said second position to lock said first member against rotation.

4. A control as set forth in claim 1 which includes a fixed arcuate retaining element disposed adjacent said second member, and means on said lever cooperable with said retaining means for selectively retaining said lever in said first or second radially shifted positions during rotation of said lever.

5. The control set forth in claim 1 wherein said first motion transmitting device includes a rack member slidably disposed in said housing, and said first member includes a plurality of teeth on the outer periphery thereof and coacting with said rack member to impart motion thereto upon rotation of said first member.

6. The control set forth in claim 5 wherein a predetermined number of teeth are provided on said rack member and a predetermined number of coacting teeth are provided on said first member, said teeth disengaging after a predetermined amount of motion of said rack member in either direction and said first member being permitted further rotation relative to said rack member after disengagement of said teeth.

7. The control set forth in claim 1 wherein said means on said second member includes a link eccentrically mounted on said second member, a lever pivotally mounted at one end to said housing and engaging said second motion transmitting mechanism at the other end, said link being pivotally attached to said last named lever intermediate the ends thereof, whereby rotation of said second member causes movement of said lever through said link and movement of said second motion transmitting device through said lever.

8. The control set forth in claim 1 wherein said second member is provided with an annular groove and said housing is provided with an annular ridge received in said groove, said operating lever having means spaced from the end thereof and engaging said ridge to maintain said lever in said first position, and said ridge being interrupted at one position to permit said radial shifting of said operating lever therepast for movement of said operating lever to said second position.

9. A control of the type described comprising a housing, a first rotatably supported member, a second member concentrically and rotatably supported within said first member, a segmental gear formed on the outer periphery of said first member, a first motion transmitting device including a rack member slidably disposed in said housing, said rack adapted to coact with said gear to impart movement to said first device, a second motion transmitting device including another member slidably disposed in said housing, lever means interconnecting said second member and said another slidable member to impart movement to said second device, a single operating lever carried by and rotatable in unison with one of said members, said lever being shiftable laterally relative to said one member between first and second positions, and a mechanism normally connecting said first and second members for rotation in unison with said lever when said lever is in said first position, said lever coacting with said connecting mechanism for operatively disconnecting said other member from said lever when the latter is in said second position.

References Cited in the file of this patent
UNITED STATES PATENTS

| | | |
|---|---|---|
| 2,933,943 | Buddo et al. | Apr. 26, 1960 |
| 2,935,891 | Morse | May 10, 1960 |
| 2,947,191 | Waner | Aug. 2, 1960 |
| 2,949,988 | Morse | Aug. 23, 1960 |

UNITED STATES PATENT OFFICE
CERTIFICATE OF CORRECTION

Patent No. 3,153,944            October 27, 1964

James Sydney Bentley

It is hereby certified that error appears in the above numbered patent requiring correction and that the said Letters Patent should read as corrected below.

Column 1, line 53, for "one-arm" read -- one-armed --; column 3, line 18, for "level" read -- lever --.

Signed and sealed this 11th day of May 1965.

(SEAL)
Attest:

ERNEST W. SWIDER
Attesting Officer

EDWARD J. BRENNER
Commissioner of Patents